United States Patent
Texier

(10) Patent No.: US 11,167,448 B2
(45) Date of Patent: Nov. 9, 2021

(54) PREFORM HAVING A STAR-SHAPED BOTTOM AND CORRESPONDING CONTAINER

(71) Applicant: SOCIÉTÉ D'EXPLOITATION DES SOURCES ROXANE, La Ferriere Bochard (FR)

(72) Inventor: Stéphane Texier, St Yorre (FR)

(73) Assignee: SOCIÉTÉ D'EXPLOITATION DES SOURCES ROXANE, La Ferriere Bochard (FR)

( * ) Notice: Subject to any disclaimer, the term of this patent is extended or adjusted under 35 U.S.C. 154(b) by 171 days.

(21) Appl. No.: 15/036,028

(22) PCT Filed: Nov. 3, 2014

(86) PCT No.: PCT/FR2014/052788
§ 371 (c)(1),
(2) Date: May 11, 2016

(87) PCT Pub. No.: WO2015/071569
PCT Pub. Date: May 21, 2015

(65) Prior Publication Data
US 2016/0279832 A1  Sep. 29, 2016

(30) Foreign Application Priority Data
Nov. 14, 2013 (FR) ...................... 1361104

(51) Int. Cl.
*B65D 1/02* (2006.01)
*B29B 11/14* (2006.01)
(Continued)

(52) U.S. Cl.
CPC .............. *B29B 11/14* (2013.01); *B29B 11/08* (2013.01); *B29C 49/0078* (2013.01);
(Continued)

(58) Field of Classification Search
CPC ... B29B 2911/1402; B29B 2911/14026; B29B 2911/14033; B29B 2911/1404;
(Continued)

(56) References Cited

U.S. PATENT DOCUMENTS 5,047,271 A    9/1991  Feddersen et al.
5,160,059 A *  11/1992 Collette .............. B29C 49/0078
                                                      215/375
(Continued)

FOREIGN PATENT DOCUMENTS

DE    102012004613 A1    7/2013
FR        2724588    *   3/1996 ............. B29C 49/00
(Continued)

OTHER PUBLICATIONS

International Search Report dated Feb. 2, 2015 re: Application No. PCT/FR2014/052788; pp. 1-3; citing: U.S. Pat. No. 5,160,059 A, US 2013/134124 A1, WO 2011/056176 A1, WO 91/00220 A1, U.S. Pat. No. 5,047,271 A, FR 2 724 588 A1, DE 10 2012 004613 A1.

*Primary Examiner* — James N Smalley
*Assistant Examiner* — Elizabeth J Volz
(74) *Attorney, Agent, or Firm* — Cantor Colburn LLP

(57) ABSTRACT

The invention relates to a preform (1) for a container (2) made of plastic, wherein the preform (1) comprises a body part (3) comprising a wall having a thickness (e1) which extends along a longitudinal axis (X) and which is connected, via a periphery (8), to a closed bottom part (5) which has an apex (10). According to the invention, the bottom part (5) has ribs (11) which each extend from the apex (10) of the bottom part (5) to the periphery (8) so as to form a star, and a substantially triangular zone (12) arranged between two adjacent ribs (11) and a portion (8*a*) of the periphery (8) has a thickness (e3) which is less than the thickness (e1).

7 Claims, 1 Drawing Sheet

(51) Int. Cl.
    *B29B 11/08*       (2006.01)
    *B29C 49/00*       (2006.01)
    *B29C 49/08*       (2006.01)
    B29C 49/06       (2006.01)
    B29K 667/00     (2006.01)
    B29L 31/00       (2006.01)

(52) U.S. Cl.
CPC ............ B29C 49/08 (2013.01); B65D 1/0276 (2013.01); *B29B 2911/1402* (2013.01); *B29B 2911/1404* (2013.01); *B29B 2911/14026* (2013.01); *B29B 2911/14033* (2013.01); *B29B 2911/1434* (2013.01); *B29B 2911/14326* (2013.01); *B29B 2911/14366* (2013.01); *B29B 2911/14486* (2013.01); *B29C 49/06* (2013.01); *B29K 2667/003* (2013.01); *B29L 2031/7158* (2013.01)

(58) Field of Classification Search
CPC ... B29B 2911/14326; B29B 2911/1434; B29B 2911/14366; B29B 2911/14486; B29C 49/0078; B29C 49/08; B29C 49/06; B29L 2031/7158; B29K 2667/003
USPC .......................... 220/606; 215/375; 264/523
See application file for complete search history.

(56) References Cited

U.S. PATENT DOCUMENTS

| 2012/0094043 A1* | 4/2012 | Bertheol | B29B 11/14 |
| | | | 428/35.7 |
| 2012/0263902 A1* | 10/2012 | Hanan | B29B 11/14 |
| | | | 428/36.92 |
| 2013/0134124 A1 | 5/2013 | Rashid et al. | |

FOREIGN PATENT DOCUMENTS

| FR | 2724588 A1 | 3/1996 |
| WO | 9100220 A1 | 1/1991 |
| WO | 2011056176 A1 | 5/2011 |

* cited by examiner

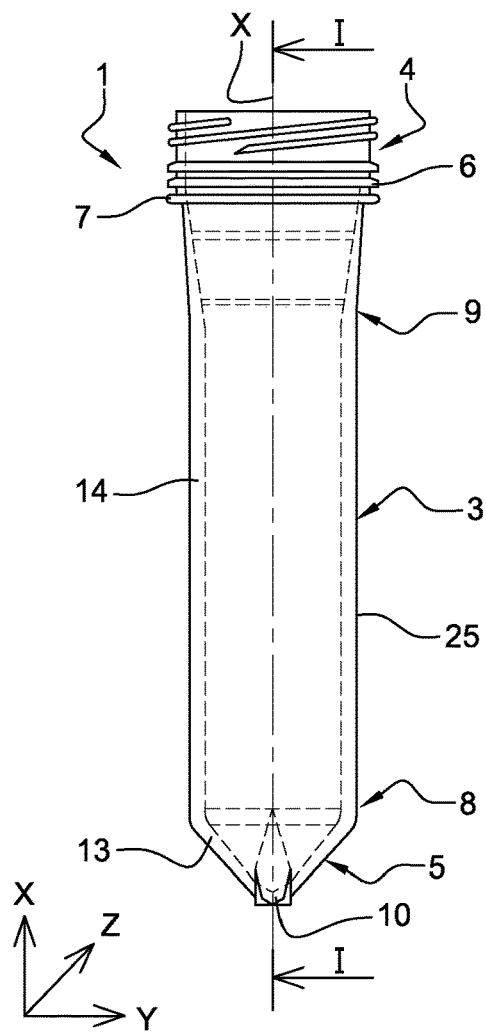
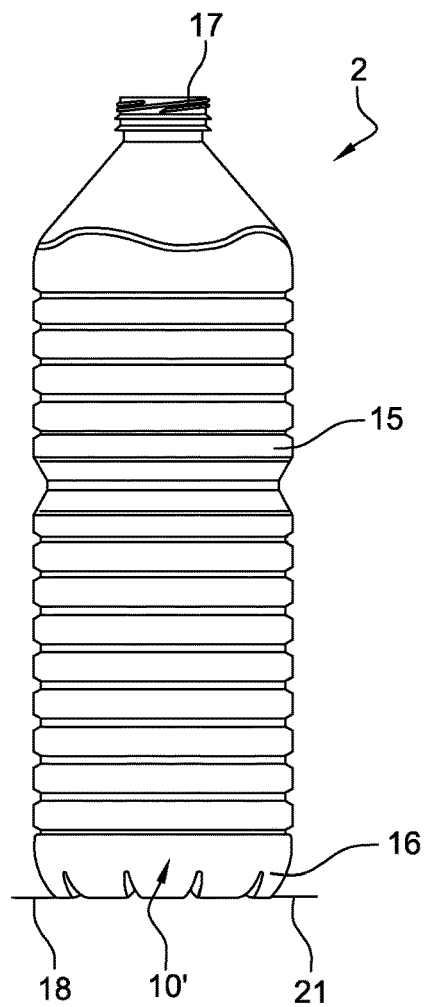
Fig. 1
Fig. 2
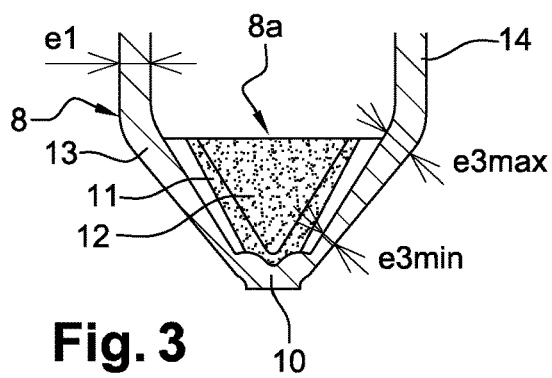
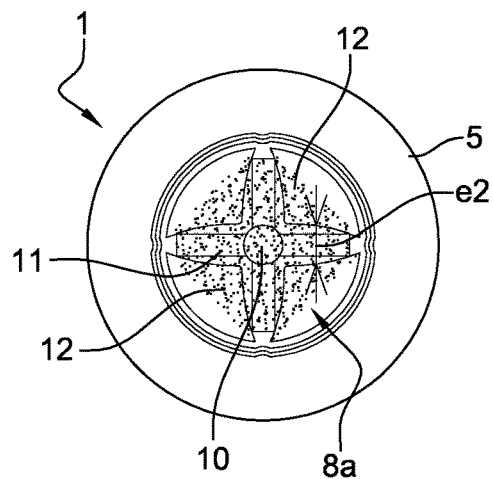
Fig. 3
Fig. 4

PREFORM HAVING A STAR-SHAPED BOTTOM AND CORRESPONDING CONTAINER

1. TECHNICAL FIELD

The invention relates to the field of bottling. In particular, the invention relates to containers made from plastics obtained typically by blow-molding or stretch blow-molding, starting with a preform.

2. BACKGROUND

Containers made from plastics are obtained by blow-molding or stretch blow-molding of preforms molded by injection-molding and by molding a plastics material. This material is typically a polymer, such as a polyethylene terephthalate (PET). A preform of this type comprises a body part extending along a longitudinal axis and connected via a bottom periphery to a closed bottom part. The body part generally comprises a wall, the thickness of which is identical to that of the wall of the bottom part.

For a number of years, preforms have been arranged such that the weight of the containers obtained from them has become increasingly lighter. It is thus difficult nowadays to identify other ways in which to lighten the weight of preforms and of containers without compromising their mechanical strength.

3. BRIEF SUMMARY

A container is provided herein that allows a weight-saving, particularly in the bottom thereof, starting with a preform of which the bottom is improved without impact on the strength of the container.

More specifically, provided herein is a preform for a container made from plastics, the preform comprising a body part comprising a wall having a thickness, which wall extends along a longitudinal axis and connected via a periphery to a closed bottom part having an apex, the preform being noticeable in that the bottom part comprises ribs each extending from the apex of the bottom part to the periphery to form a star, and in that a substantially triangular zone arranged between two adjacent ribs and a portion of the periphery has a thickness less than the thickness of the wall of the body part.

Thus, the configuration of the bottom part of a preform of this type allows a weight-saving for the preform and, as a result, a weight-saving for the container produced from this preform, while preserving mechanical strength. The weight-saving is in fact obtained by removing material in the bottom part of the preform at points which do not involve in the mechanical strength of the bottom of the container. A preform of this type, provided with these substantially triangular zones of reduced thickness, makes it possible to obtain a weight-saving of the order of 1% to 5% of the total weight of a standard preform.

More precisely, each rib has a thickness greater than the thickness of each substantially triangular zone. This is because it is necessary to have uniform distribution of the plastics material toward the neck of the preform.

Advantageously, the thickness of the substantially triangular zone varies from the apex of the bottom part to the periphery. Thus, the more the thickness of the substantially triangular zone is reduced in the vicinity of the injection point, the greater the weight-saving while preserving sufficient thickness to guarantee distribution of the plastics material and mechanical strength.

With the same aim as previously, the substantially triangular zone has a thickness that is minimal in the vicinity of the apex of the bottom part.

With a view to allowing a better distribution of the plastics material from the apex of the bottom part toward a neck of the preform, the thickness of each rib varies from the apex of the bottom part to the periphery.

Advantageously, each rib protrudes inside the bottom part. A configuration of this type, namely the modification of the internal part of the bottom part of the preform, permits the modification of only a single part (the core) of the mold in which the preform is produced. This contributes to a financial saving in terms of the manufacture of the preform.

Preferably, the preform comprises three, four or five ribs to form the star. A configuration of this type makes it possible to obtain substantially triangular zones with a sufficiently large surface area and with a thickness that can be reduced in order to optimize the weight-saving.

The bottom part of the preform may have a conical or spherical cross section.

The invention also relates to a container made from plastics material obtained by blow-molding of a preform having the features as mentioned above.

According to the invention, a container of this type comprises a body extending along the longitudinal axis and a closed bottom extending said body, the bottom comprising a seat defining a positioning surface and an apex.

4. BRIEF DESCRIPTION OF THE DRAWINGS

Further innovative features and advantages will emerge from the following description provided by way of indication and which is not limiting in any way, with reference to the appended drawings, in which:

FIG. 1 represents a preform according to the invention;

FIG. 2 represents a container that may be obtained from the preform according to the invention by means of a blow-molding or stretch blow-molding operation;

FIG. 3 schematically illustrates a sectional view of I-I of the lower part of the preform according to FIG. 1; and FIG. 4 is a bottom view of the preform according to FIG. 1.

5. DETAILED DESCRIPTION

FIG. 1 represents a preform 1 from which will be manufactured a model of a container 2, as represented, for example, in FIG. 2. The preform 1 is produced by injection of a polymer material into a mold. The polymer material is, in a known manner, a thermoplastic such as polyethylene terephthalate (PET).

In the remainder of the description, in order to facilitate further comprehension of the invention, the preform 1 is considered to comprise a body part 3 extending in a vertical longitudinal direction X. Also represented is the transverse direction Y, which is perpendicular to the longitudinal direction X and to a horizontal direction Z, such that these three directions X, Y, Z form a direct orthogonal reference, as illustrated in FIG. 1.

The terms "lower" and "upper" are defined with respect to the vertical longitudinal direction X.

The body part 3 of the preform 1 has a cylindrical shape. Said body part 3 extends between a neck 4 or throat located in the upper part and a closed bottom part 5 in the lower part. The neck 4 is connected to the body part via a join 9 and has an exterior screwthread 6 and an attachment flange 7. The bottom part 5 is connected to the body part 3 via a periphery 8. The bottom part 5 also comprises a wall 13 and an apex 10 traversed by the direction X. This apex 10 corresponds to the point of injection of the plastics material into the mold to form the preform 1. The bottom part 5 here has a conical cross section.

The body part 3 has a wall 14 having a thickness e1 that is constant between the periphery 8 and the join 9. This thickness e1 of the wall of the body part 3 will depend on the shape and on the dimensions of the container 2 to be obtained.

As may be seen, in particular, in FIGS. 3 and 4, the bottom part 5 has ribs 11, each extending from the apex 10 of the bottom part 5 to the periphery 8 to form a star. More precisely, the ribs 11 have a length substantially equal to that of the wall 13 of the bottom part 5 such that the plastics is distributed uniformly and easily from the apex 10, which is the point of injection of the plastics, to the neck 4 of the preform 1. These ribs 11 in fact make it possible to channel the plastics from the apex 10 to the neck 4. Here, the ribs 11 protrude inside of the bottom part 5. The preform 1 also has an external surface 25 that is continuous from the body part 3 to the bottom part 5. The continuous external surface 25 makes it possible to preserve the shape and the arrangement of the various parts making up an "external" mold part, which constitutes a guarantee in the sequence of the other steps of manufacture, packaging, transportation of the preforms, stretch blow-molding machines, etc.

The ribs 11 are arranged regularly and/or in an equidistant manner in the bottom part 5 of the preform 1 about the apex 10. The ribs 11 each have a thickness e2 similar to the thickness e1 of the wall 14 of the body part 3, that is to say substantially smaller or equal. Thus, there is no sharp angle at the periphery 8, i.e. between the wall 14 of the body part 3 and the wall 13 of the bottom part 5.

According to the invention, a substantially triangular zone 12 is arranged between two adjacent ribs 11 and a portion 8a of the periphery 8 in the bottom part 5. As illustrated in FIG. 4, there are four ribs 11 arranged in the bottom part 5. This thus gives rise to four substantially triangular zones 12 arranged in the bottom part 5. However, the bottom part 5 may comprise three or even five ribs distributed regularly and/or in an equidistant manner, depending on the dimensions of the preforms. Each substantially triangular zone 12 has a thickness e3 less than the thickness e1 of the wall 14 of the body part 3 in order to allow a weight-saving.

In FIG. 3 it can be seen that the thickness of the substantially triangular zone 12 varies from the apex 10 of the bottom part 5 to the periphery 8. In particular, the thickness of the zone 12 increases from the apex 10 to the periphery 8. In other words, the triangular zone has a thickness $e3_{min}$ that is minimal in the vicinity of the apex 10, and a thickness $e3_{max}$ that is maximal in the vicinity of the periphery 8. Advantageously, the thickness e3 of the substantially triangular zone 12 is also less than the thickness e2 of the ribs 11.

The invention also relates to a container 2 as illustrated in FIG. 2. This container 2 is obtained, in a known manner, by means of a blow-molding or stretch blow-molding process in a stretch blow-molding machine starting from the preform 1 having the abovementioned features.

The container 2 comprises a cylindrical body 15 extending in the longitudinal direction X, a closed bottom 16 extending the body 15 in the lower part and a neck 17 arranged in the upper part. The neck 4 of the preform 1 has a shape and a dimension which do not vary upon formation of the container 2 from the preform 1 and corresponds to the neck 17 of the container 2. The body part 3 corresponds to the body 14 of the container, and the bottom part 5 corresponds to a bottom part 16 after the blow-molding or stretch blow-molding operation. The bottom 16 comprises a seat 18 defining a positioning surface 21. The periphery 8 of the preform 1 will correspond in part to the seat 18 of the container 2 after the blow-molding operation. The seat 18 is present in the form of a ring, the center of which is defined by the apex 10' and which comprises a substantially planar surface such that the container 2 rests in a stable manner on a flat surface. The seat 18 defines, substantially, the periphery of the bottom of the container 2. The apex 10 of the bottom part 5 also corresponds to the apex 10' of the bottom 16 of the container 2. Thus, the container 2 made from plastics obtained from the preform 1 according to the invention offers a weight-saving of between 1 and 5% as compared to a container produced from a standard preform. The weight of the preform 1 is in fact identical to the weight of the corresponding container.

The invention is described above by way of example. It is understood that a person skilled in the art is capable of producing different variant embodiments of the invention by combining, for example, the above different features taken alone or in combination, without thereby departing from the scope of the invention.

The invention claimed is:

1. A preform for a container in plastic, the preform comprising:
    a body part comprising a wall of thickness e1 extending along a longitudinal axis X,
    a periphery, and
    a closed bottom part comprising
        ribs each extending from a relative angular position apex of the bottom part to the periphery to form a star, and each rib having a thickness e2 equal to the thickness e1 or less than the thickness e1, and
        a substantially triangular zone, arranged between two adjacent ribs and a portion of the periphery, having a thickness e3 less than the thickness e1,
        the thickness e3 being less than the thickness e2;
    the body part being connected via the periphery to the closed bottom part; and
    the closed bottom part having a conical cross section.

2. The preform as claimed in claim 1, wherein the thickness e3 of the substantially triangular zone varies from the apex of the bottom part to the periphery.

3. The preform as claimed in claim 2, wherein the substantially triangular zone has a thickness $e3_{min}$ that is minimal in the vicinity of the apex of the bottom part.

4. The preform as claimed in claim 1, wherein the thickness e2 of each rib varies from the apex of the bottom part to the periphery.

5. The preform as claimed in claim 1, wherein each rib protrudes inside the bottom part.

6. The preform as claimed in claim 1, wherein the preform comprises three, four or five ribs forming the star.

7. A container made from plastics obtained by blow-molding or stretch blow-molding of a preform as claimed in claim 1, the container comprising a body extending along the longitudinal axis X and a closed bottom extending said body, the bottom comprising a seat defining a positioning surface and an apex.

\* \* \* \* \*